UNITED STATES PATENT OFFICE.

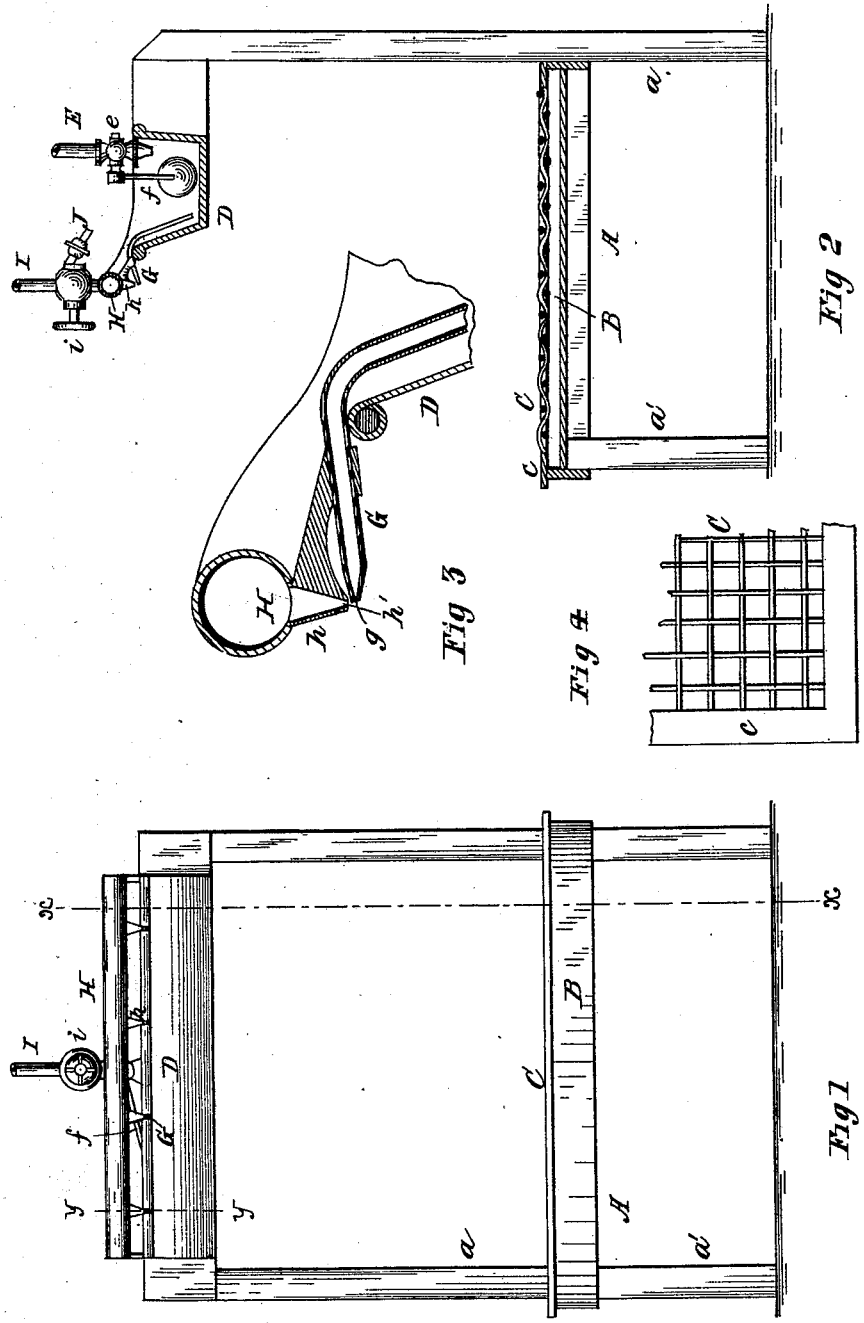

JOSEPH P. ELLACOTT, OF CHICAGO, ILLINOIS, ASSIGNOR TO UNION BRASS MANUFACTURING COMPANY, OF SAME PLACE.

CLOTHES-DAMPENER.

SPECIFICATION forming part of Letters Patent No. 234,118, dated November 9, 1880.

Application filed March 15, 1880. (No model.)

*To all whom it may concern:*

Be it known that I, JOSEPH P. ELLACOTT, of Chicago, in the county of Cook and State of Illinois, have invented certain new and useful Improvements in Clothes-Dampeners, which are fully described in the following specification, reference being had to the accompanying drawings, in which—

Figure 1 represents a front elevation of a machine embodying my improvements; Fig. 2, a vertical section of the same, taken on the line $x\,x$, Fig. 1; Fig. 3, a detail section on an enlarged scale, taken on the line $y\,y$, Fig. 1; and Fig. 4, a detail plan section, showing a portion of the support or table on which the clothes rest during the sprinkling.

My invention relates to a machine for sprinkling clothes as they are moved along over a bed or table, the object being to produce a very fine water-spray, which will be distributed evenly over the clothes.

The invention consists in a steam-spraying device applied to a sprinkling-machine, the construction and operation of which will be hereinafter fully described, and the special improvements which it is desired to secure by Letters Patent pointed out definitely in the claims.

In the drawings, A represents a supporting-frame, the two rear posts, $a$, of which are much longer than the front posts, $a'$. A shallow pan, B, is supported on the top of the short posts and fastened at the rear to the long posts $a$. This pan has a cover, C, of coarse wire-gauze or woven wire, which is held at the edges in a suitable frame, $c$, and is hinged at its rear edge to the rear edge of the pan, so that it may be lifted at pleasure for emptying and cleaning the pan, or any other purpose desired. A pan or trough, D, is fastened to the upper ends of the posts $a$ by suitable brackets, so that the pan is projected forward above the pan B, which it overhangs, as shown in Fig. 2 of the drawings. This upper pan is the receptacle for the water to be used in sprinkling, and is supplied by a water-pipe, E, in the lower end of which is a regulating-cock, $e$, which is adjusted automatically by means of a float attached by an arm, $f$, to the cock. The float resting upon the surface of the water in the pan adjusts the cock as the water rises and falls thereby regulating the supply and keeping the water at substantially the same level, in a manner which is well known and understood. A series of short pipes, G, are arranged at the front of the water-receptacle D, the inner ends of which are bent downward and extend nearly to the bottom of said pan, while their outer ends are bent outward and slightly downward over the upper edge of the pan, in front of which they project, as shown in Fig. 3 of the drawings. The front ends of these pipes terminate in fine jet-holes $g$, which are very much smaller than the body of the pipes. A steam-pipe, H, is arranged horizontally just above the outer ends of the pipes G, and is provided on its under side with short jet-pipes $h$, one for each of the water-pipes G. These jet-pipes are conical in form, so that they provide a passage from the pipe H, gradually constricted, until at the lower extremity it terminates in a fine jet-opening, $h'$, and the pipes are so arranged that this opening is immediately above the jet-opening of the water-pipes, the latter of which for the most efficient work should be arranged just a little back of the center of the former, and have the portion of the pipe below them slightly drawn back beyond the portion above them.

Steam is let into the pipe H from a supply-pipe, I, by means of a steam-valve, $i$, which may be provided with a small waste-cock, J, by means of which the water formed by condensation may be discharged from the valve and pipe. The steam-jet and water-jet pipes may be constructed or connected so as to form substantially one piece, and the steam-pipe is supported in any suitable way, being shown in the drawings connected to the water-pan.

The operation of this machine is as follows: The pan D is nearly filled with water, and steam is then let on to the pipe H. The small jet of steam escaping from the jet-pipes $h$ operates in the well-known way as an exhaust, thereby drawing water through the pipes G, which escapes in fine jets through the small openings in the outer ends of the latter. The small jets of water are converted into very fine spray by the jets of steam which are at the same time condensed by the water. This fine water-spray falls evenly upon the clothes on the wire grating below, which are moved along upon the latter by hand or by suitable mechanism, as may be desired, or may rest upon the wire grating until sufficiently dampened. The clothes are thus more thoroughly and evenly dampened than with the ordinary sprinkling-machines, in which spray and drops of water are commingled.

Very little drip will be occasioned with this machine; but if any is formed it will drop through the woven-wire cover into the shallow pan below, which serves as a drip-pan. The clothes therefore will not be excessively wet in spots by coming in contact with the drip.

Obviously the construction and arrangement of different parts of this machine may be modified to some extent without materially affecting the main features of the invention.

This invention may also be applied to machines for dampening other articles, such as paper, &c.

In the above description I have referred only to the use of steam; but air may also be used, if desired, without changing the mechanism. I prefer steam, however.

Having thus described my invention, what I claim as new, and desire to secure by Letters Patent, is—

1. In a dampening-machine, a perforated bed to support the articles to be dampened, in combination with a steam-spraying mechanism arranged above the bed, substantially as set forth.

2. In a dampening-machine, the water-pan D, in combination with the water-supply pipe E, having the float-valve $e$, the water-jet pipes G, the steam-pipe H, and the steam-jet pipes $h$, substantially as and for the purposes set forth.

3. In a dampening-machine, the drip-pan B, in combination with the woven-wire cover C, and with a sprinkling device arranged over the woven-wire cover, substantially as and for the purpose described.

4. The supporting-frame A, having the low supports, $a'$, and the higher supports, $a$, in combination with a level bed resting at one side on the low supports and affixed at the other to the high supports, to hold the articles to be dampened, and with a steam-spraying device attached to the upper part of the higher supports and over the bed, substantially as described.

JOSEPH P. ELLACOTT.

Witnesses:
JNO. C. MACGREGOR,
W. C. CORLIES.